（12） United States Patent
Nakajima et al.

(10) Patent No.: US 7,976,421 B2
(45) Date of Patent: Jul. 12, 2011

(54) DIFFERENTIAL GEAR FOR VEHICLE AND ASSEMBLING METHOD OF THE SAME

(75) Inventors: Shinichiro Nakajima, Niiza (JP); Masashi Suzuki, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 401 days.

(21) Appl. No.: 11/845,443

(22) Filed: Aug. 27, 2007

(65) Prior Publication Data
US 2008/0051244 A1 Feb. 28, 2008

(30) Foreign Application Priority Data

Aug. 28, 2006 (JP) ................................. 2006-231099
Feb. 20, 2007 (JP) ................................. 2007-039425

(51) Int. Cl.
*F16H 48/06* (2006.01)
*F16H 57/04* (2010.01)
(52) U.S. Cl. ........................................ 475/230; 475/160
(58) Field of Classification Search .................. 475/160, 475/230, 234, 235, 236, 340, 331
See application file for complete search history.

(56) References Cited

U.S. PATENT DOCUMENTS

| | | | |
|---|---|---|---|
| 2,364,411 A | 12/1944 | White | |
| 2,945,400 A * | 7/1960 | Dupras | 475/234 |
| 3,264,901 A * | 8/1966 | Ferbitz et al. | 475/235 |
| 3,406,592 A * | 10/1968 | Von Kaler | 475/230 |
| 4,667,534 A * | 5/1987 | Kataoka | 475/160 |
| 5,584,777 A | 12/1996 | Sander et al. | |
| 6,261,202 B1 * | 7/2001 | Forrest et al. | 475/235 |
| 6,408,719 B1 * | 6/2002 | Seki et al. | 74/650 |
| 2006/0287155 A1 * | 12/2006 | Nakajima | 475/230 |
| 2006/0287156 A1 | 12/2006 | Nakajima | |
| 2007/0095167 A1 | 5/2007 | Nakajima | |
| 2008/0004151 A1 | 1/2008 | Nakajima et al. | |

FOREIGN PATENT DOCUMENTS

| | | |
|---|---|---|
| DE | 37 06 217 | 9/1988 |
| DE | 196 37 120 | 1/1998 |
| DE | 10 2004 003643 | 8/2005 |
| EP | 0280093 | 8/1988 |
| GB | 207 729 | 12/1923 |
| JP | 57 129949 | 8/1982 |
| JP | 58 137643 | 8/1983 |
| JP | 63 235126 | 9/1988 |
| JP | 02 105637 | 8/1990 |

OTHER PUBLICATIONS

English translation of DE19637120C, http:epo.wordlingo.com, Apr. 27, 2010.*
U.S. Appl. No. 12/262,688, filed Oct. 31, 2008, Nakajima.

* cited by examiner

*Primary Examiner* — Roger Pang
(74) *Attorney, Agent, or Firm* — Oblon, Spivak, McClelland, Maier & Neustadt, L.L.P.

(57) ABSTRACT

A differential gear 1 for a vehicle comprises a differential case 2 having a pair of holes 9R, 9L for drive shafts, a pair of pinion gears 3, 4 supported by pinion gear supporters 10, 11 and a pair of side gears 5R, 5L engaging with the pinion gears 3, 4. A pair of thrust washers 6R, 6L is interposed between the backs of the side gears 5R, 5L and the inner peripheries of the holes 9R, 9L without radial movement.

11 Claims, 20 Drawing Sheets

DIFFERENTIAL GEAR FOR VEHICLE AND ASSEMBLING METHOD OF THE SAME

INCORPORATION BY REFERENCE

The present application claims priority under 35 U.S.C. §119 to Japanese Patent Applications No. 2006-231099 filed on Aug. 28, 2006 and No. 2007-039425 filed on Feb. 20, 2007. The contents of the applications are incorporated herein by reference in their entirety.

BACKGROUND OF THE INVENTION

1. Field of the Invention

This invention relates to a differential gear for a vehicle whose plural pinion gears are supported by pinion gear supporters of a differential case, and an assembling method of the differential gear.

2. Discussion of the Background

Japanese patent application publication No. 2006-46642, for example, discloses a differential gear which has a pair of pinion gears so-called "shaftless type." The differential gear comprises the pair of pinion gears, a differential case rotated by an engine torque, a pair of side gears engaging with each of the pinion gears in the differential case and a pair of thrust washers respectively receiving thrust forces of the side gears. Each pinion gear has a supported portion and an engaging portion all round, and is arranged on the line vertical to a rotational axis of the differential case. The differential case has a pair of holes for a pair of right and left drive shafts and a pair of holes for the pair of pinion gears. Each hole for the pinion gear has a first supporting surface to support the supported portion of the pinion gear. The hole for the pinion is inwardly elongated to form a second supporting surface to support a part of the engaging portion of the pinion gear. Each side gear is a substantially circular bevel gear whose outer diameter is larger than the pinion gear's and is arranged on the rotational axis of the differential case. The inner surface of the side gear is spline-engaged with the drive shaft. Each thrust washer is interposed between the back face of the side gear and the inner periphery of the hole for the drive shaft. The differential gear is assembled to adjust the engagement of the pair of pinion gears and side gears.

The differential case is rotated about the rotational axis by the engine torque via a drive pinion and a ring gear. Due to the rotation of the differential gear, the torque is transmitted to the pair of pinion gears and further to the pair of side gears. Because the side gears are respectively spline-engaged with the drive shafts, the engine torque is distributed to the pair of right and left drive shafts according to the driving situation through the drive pinion, ring gear, differential case, pinion gears and side gears.

To assemble the differential gear, first the pinion gears are inserted into the differential case to be supported by the respective holes for the pinion gears. Next the side gears are inserted into the differential case to align their axes with the rotational axis of the differential case. And the thrust washers are interposed between the back of the side gears and the inner peripheries of the holes for the drive shafts respectively. Then the pair of side gears engages with the pair of pinion gears. Finally the right and left drive shafts are inserted into and spline-engaged with the side gears.

In the prior art, however, the thrust washers are not positioned before connection with the drive shafts. Therefore, the thrust washers may move radially from the predetermined position until transferring to a process of the drive shaft connection, so that the operator would correct the position of the thrust washers at the time. As a result, the process may be complicated.

SUMMARY OF THE INVENTION

According to the invention, a differential gear for a vehicle comprises a differential case, plural pinion gears, a pair of side gears and a pair of thrust washers. The differential case has plural support portions to support the pinion gears and a pair of holes for drive shafts. The side gears engage with the pinion gears. Each thrust washer is interposed between the back of each side gear and the periphery of each hole of the differential case without radial movement.

According to the invention, in an assembling method of a differential gear for a vehicle, the differential case has plural support portions to support plural pinion gears and a pair of holes for drive shafts. The method comprises steps of; inserting the pinion gears into the differential case and supporting the pinion gears at the support portions; inserting a pair of side gears into the differential case to align their axes with a rotational axis of the drive shafts; engaging the side gears with the pinion gears; and interposing a pair of thrust washers between the backs of the side gears and the peripheries of each hole of the differential case respectively without restriction of radial movement.

BRIEF DESCRIPTION OF THE DRAWINGS

Various objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
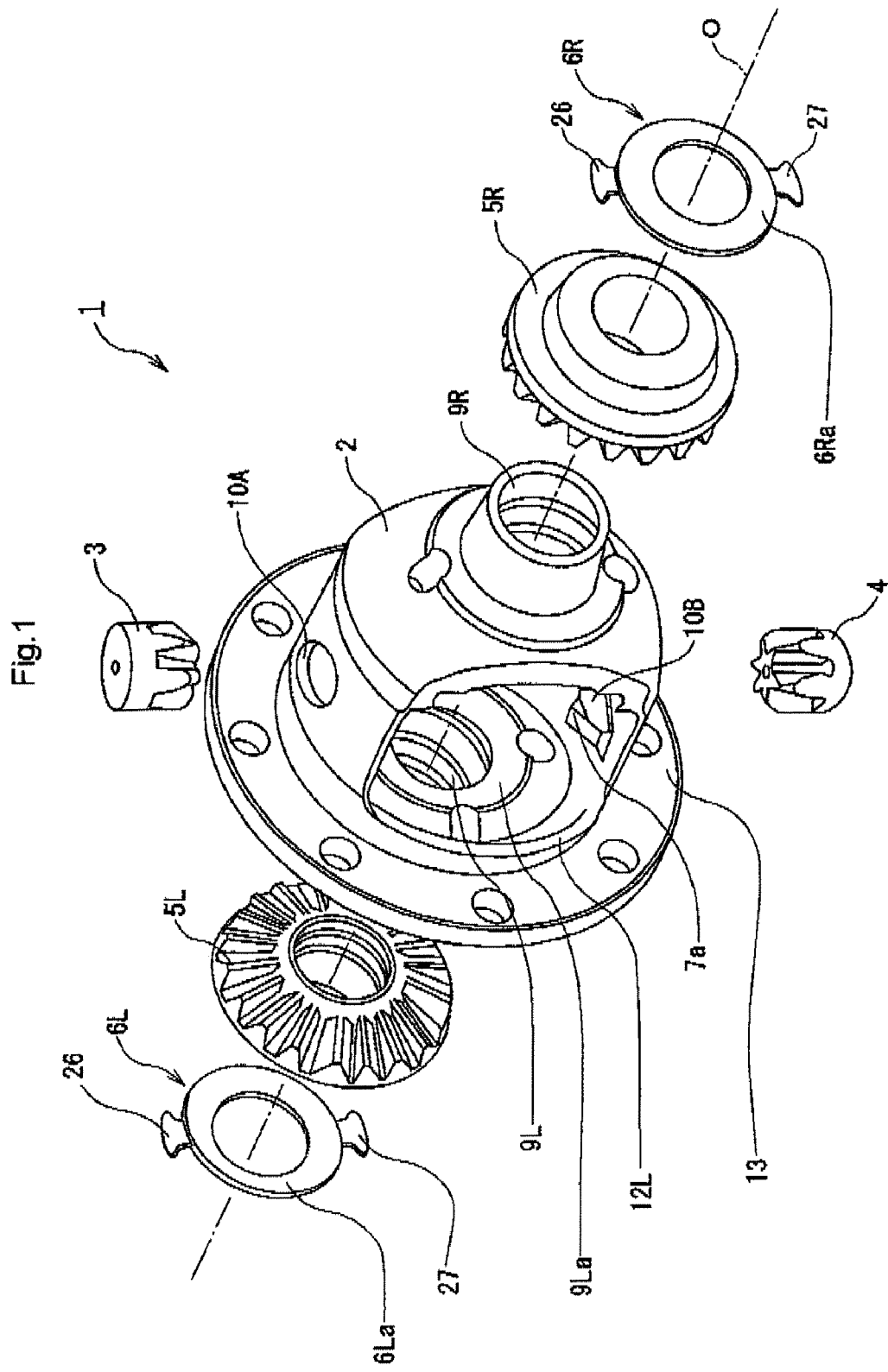
FIG. 1 is an exploded view of a differential gear for a vehicle of a first embodiment related to the invention.
Figure 2:
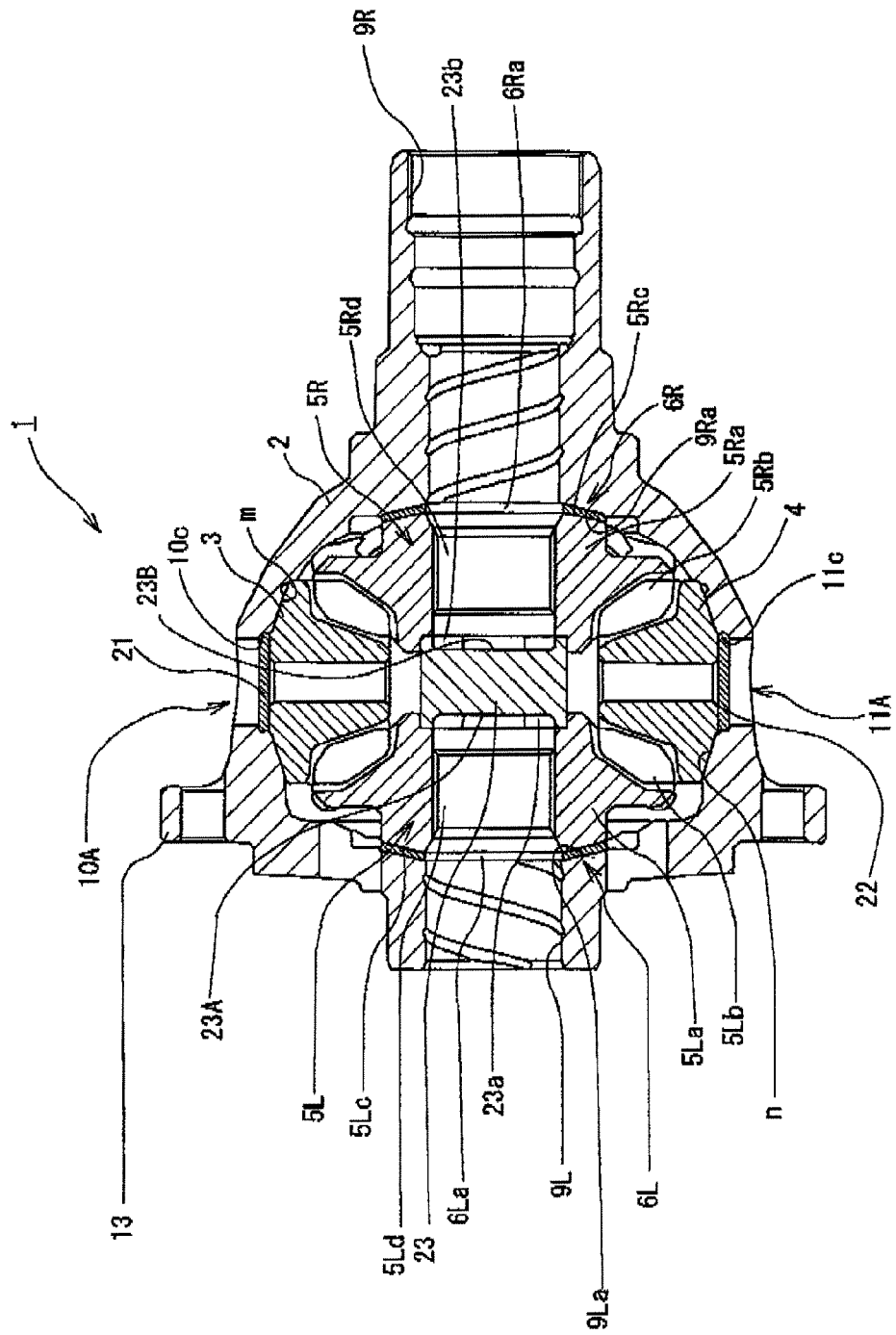
FIG. 2 is a longitudinal section view of the first embodiment.
Figure 3:
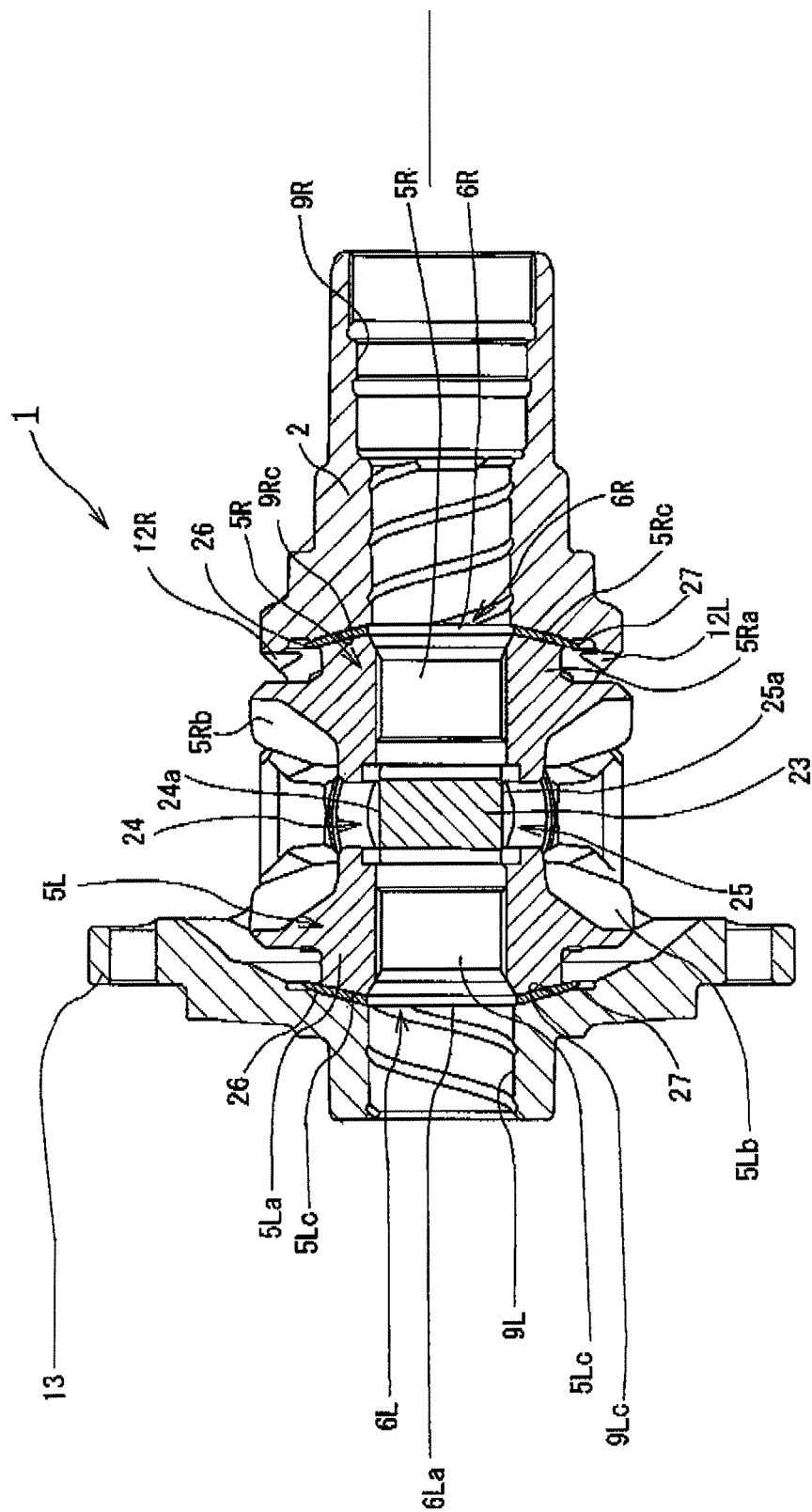
FIG. 3 is a cross section view of the first embodiment.

A first embodiment of a differential gear for a vehicle and an assembling method of the same related to the present invention will be described with reference to FIGS. 1 to 13. FIGS. 1 to 3 show a differential gear 1 that comprises a differential case 2, a pair of (up and down) pinion gears 3 and 4, a pair of (right and left) side gears 5R and 5L, and a pair of (right and left) thrust washers 6R and 6L. The differential case 2 is rotated by an engine torque. The pinion gears 3, 4 are arranged on a line perpendicular to a rotational axis O of the differential case 2 symmetrically. The side gears 5R, 5L are arranged on the rotational axis O of the differential case 2 symmetrically and engage with the pinion gears 3, 4. Each thrust washer 6R, 6L is arranged on the back of each side gear 5R, 5L.

Figure 5:
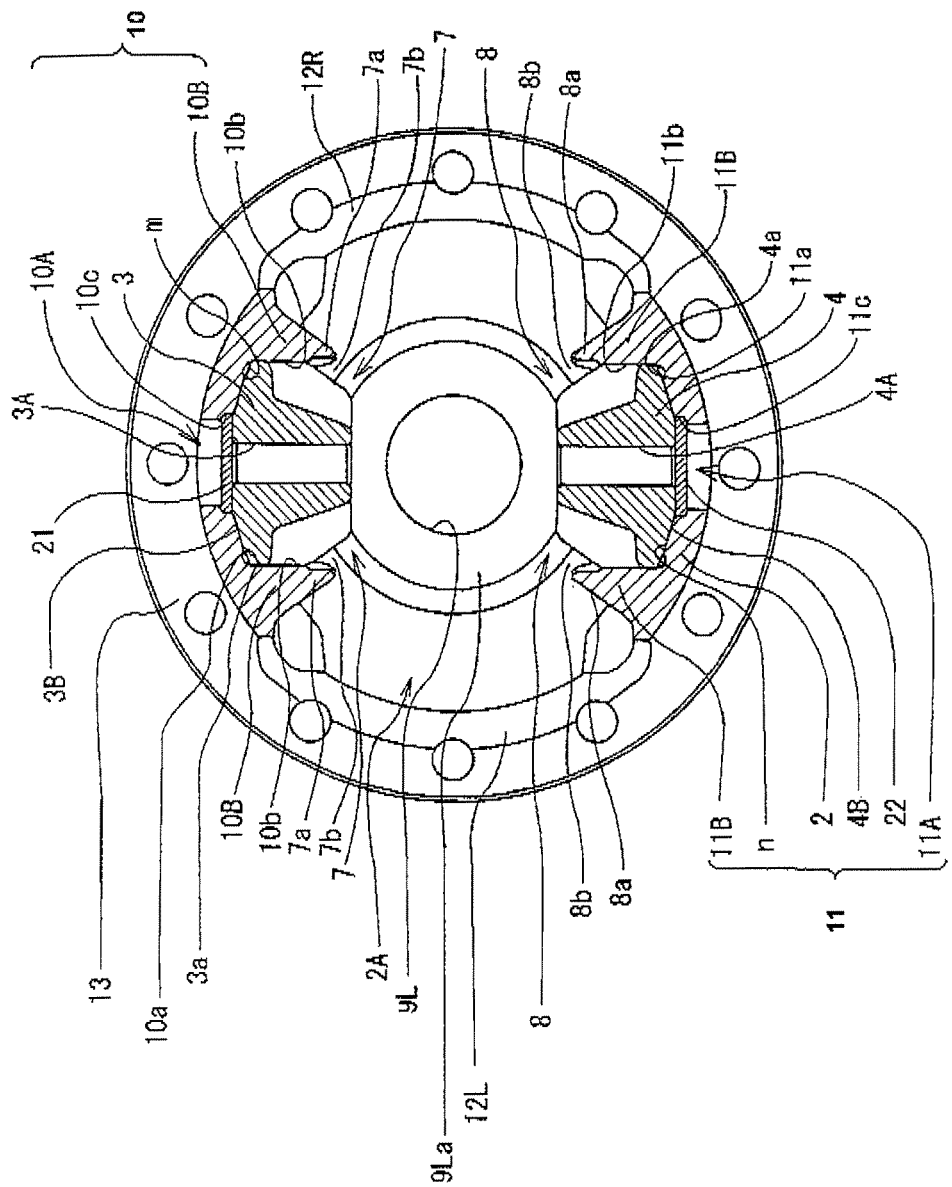
FIG. 5 is a section view of FIG. 4 perpendicular to a rotational axis of the differential case.
Figure 6:
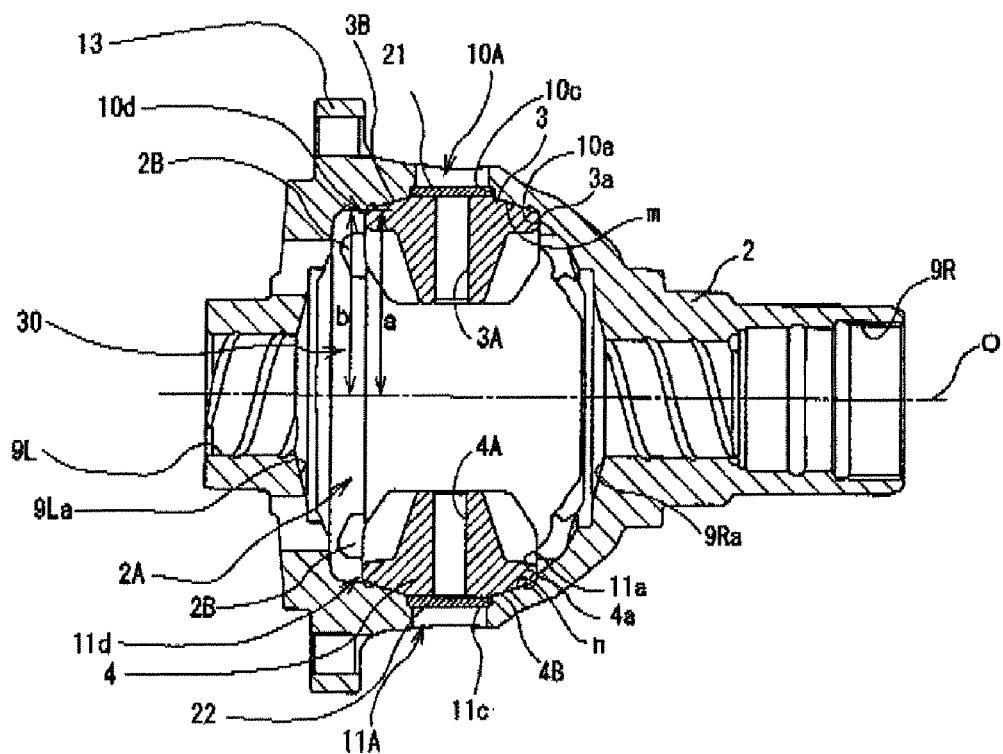
FIG. 6(a) is a section view of FIG. 4 parallel to the rotational axis of the differential case and FIG. 6(b) is an enlarged partial view of FIG. 6(a)
Figure 6:
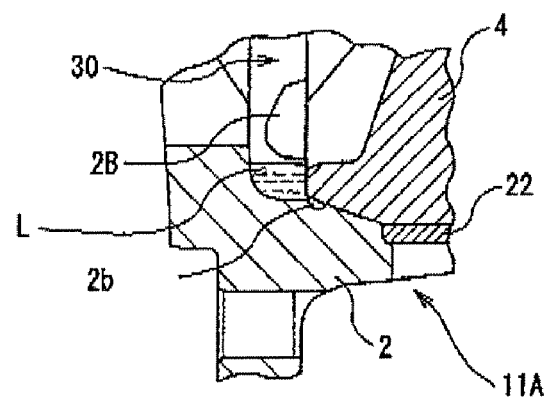

The differential case 2, as shown in FIGS. 5 and 6, is entirely one piece and inwardly has a room 2A, a concavity 2B, lubricant oil inlets 7 and 8, and lubricant oil reservoir 30. The room 2A holds the pinion gears 3, 4, side gears 5R, 5L and thrust washers 6R, 6L. The concavity 2B connects with the room 2A. The lubricant oil inlets 7, 8 introduce lubricant oil between sliding surfaces (described hereafter as first supported portions 3a, 4a of base ends B and second supported portions 3b, 4b of gear portions C) of the pinion gear 3, 4 and supporting surfaces (described hereafter as pinion gear supporting surfaces 10a, 11a of pinion gear back holes 10A, 11A and pinion gear supporting surfaces 10b, 11b of extensions 10B, 11B) of pinion gear supporters 10, 11. The lubricant oil reservoir 30 stores the lubricant oil to supply to the sliding surfaces of the pinion gear 3, 4.

Figure 4:
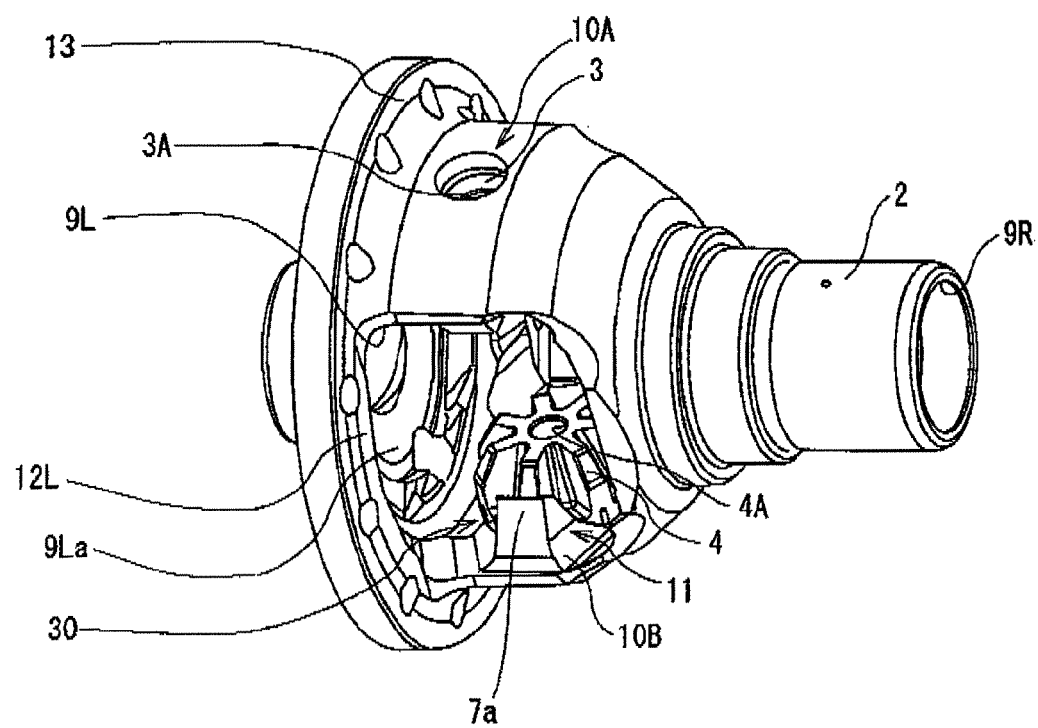
FIG. 4 is a perspective view of a differential case supporting pinion gears of the first embodiment.
Figure 7:
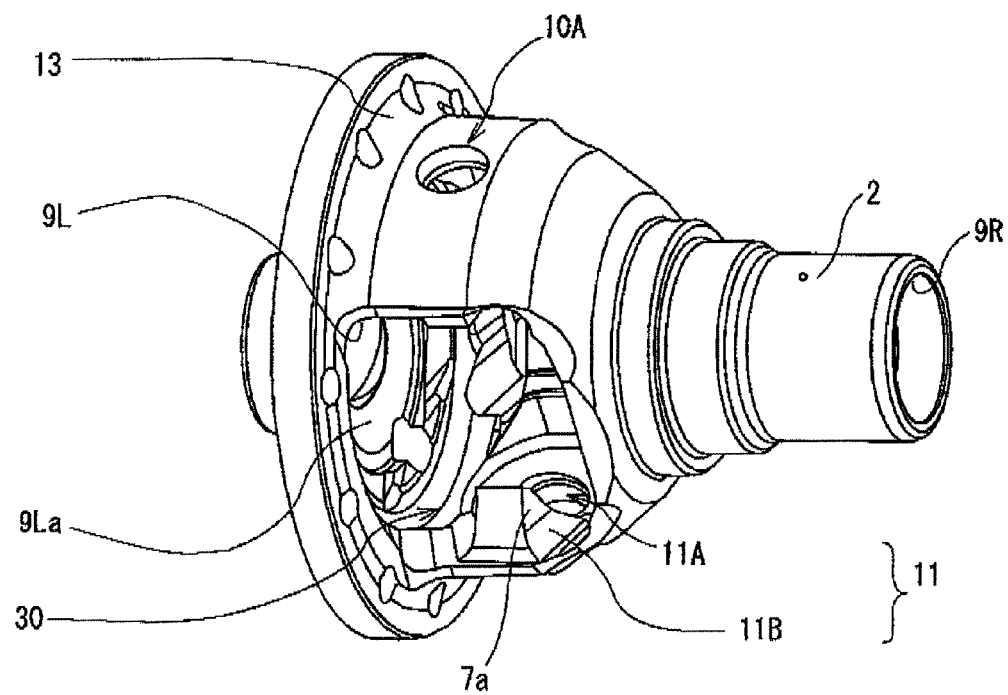
FIG. 7 is a perspective view of a differential case of the first embodiment, FIG. 8 a section view of FIG. 7 perpendicular to a rotational axis of the differential case.
Figure 8:
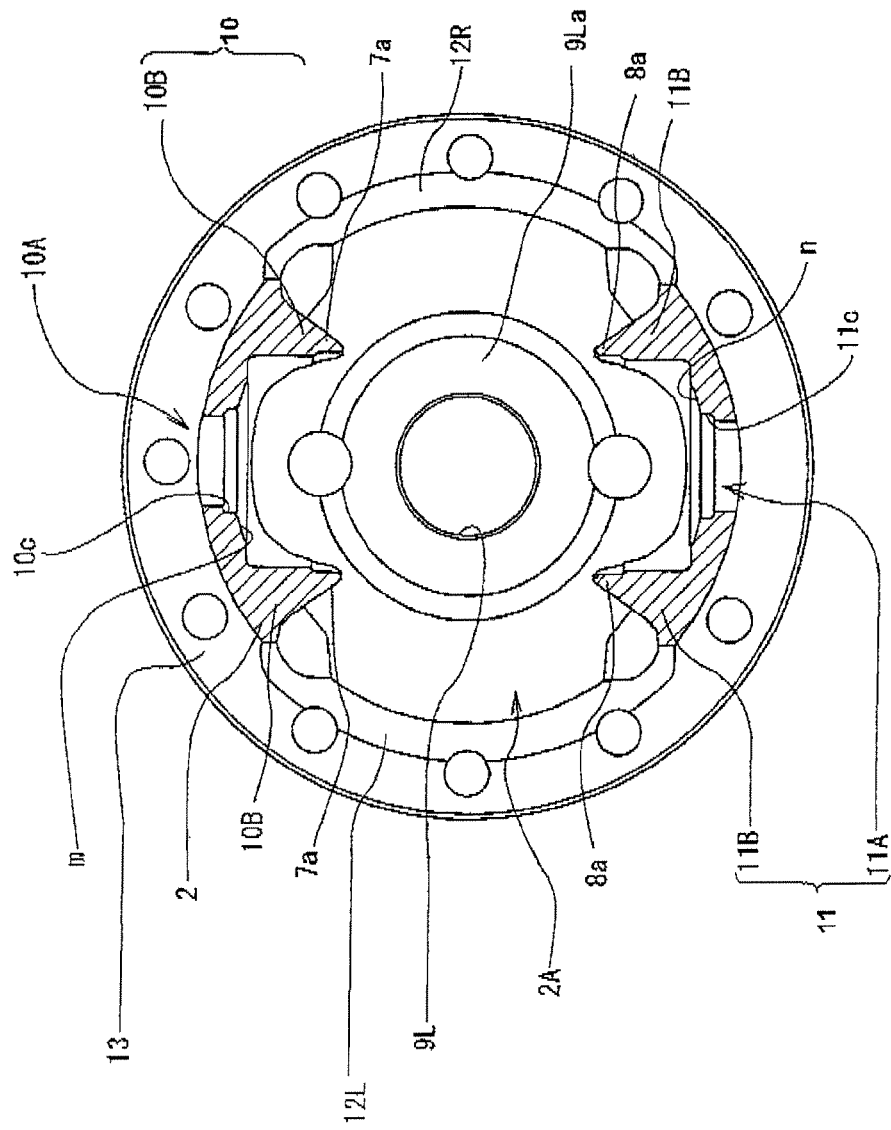

As shown in FIG. 5, the lubricant oil inlets 7, 8 are respectively constructed by the pinion gears 3, 4 and projections 7a, 8a to stir the lubricant oil (differential oil) with. The projections 3, 4, as shown in FIGS. 4, 7 and 8, are respectively integrated with the extensions 10B, 11B (described hereafter) that extend from the differential case 2 toward its rotational axis O and are disposed to hold both sides of the pinion gears 3, 4 about the rotational axis O. Spaces 7b, 8b between the projections 7a, 8a and the pinion gears 3, 4 open to the rotational axis O of the differential case 2 and around the axes of the pinion supporters 10, 11, so as to introduce the lubricant oil.

The lubricant oil reservoir 30, as shown in FIGS. 6(a) and 6(b), is a circular concavity surrounding the rotational axis O on the inner surface of the differential gear 2 and is placed close to the pinion gear supporters 10, 11 (see FIG. 5). The distance "b" between the reservoir 30 and the rotational axis O is substantially the same to the distance "a" between the first supported portions 3a, 4a and the rotational axis O so as to introduce the lubricant oil (differential oil) L into a part of the first supported portions 3a, 4a. When the differential case 2 rotates, the lubricant oil L receives a centrifugal force so as to be stored in the reservoir 30. Thus the lubricant oil is supplied to the first supported portions 3a, 4a of the pinion gears 3, 4 so as to lubricate there. And the lubricant oil reservoir 30 spreads stress occurring at feet of the pinion supporters 10, 11 so that the differential gear 2 is strengthened mechanically.

Figure 11:
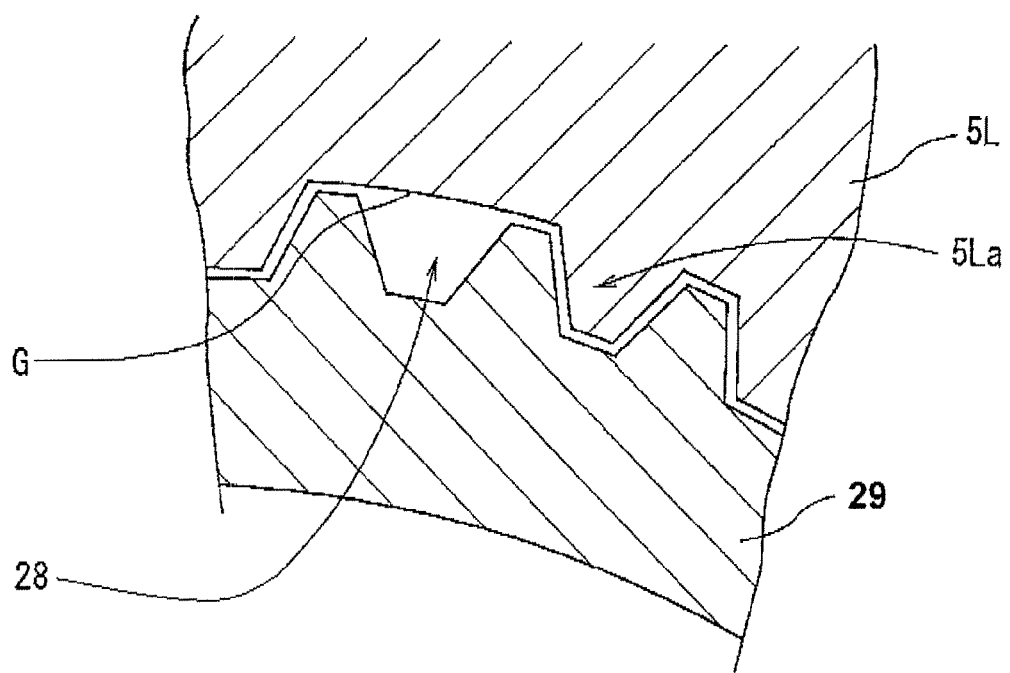
FIG. 11 is a partial section view of connection a side gear with a drive shaft of the first embodiment.

The differential case 2, as shown in FIGS. 2 and 5, has a pair of (right and left) holes 9R, 9L for drive shafts opening along the rotational axis O and a pair of (up and down) the pinion supporters 10, 11 whose axes are perpendicular to the axes of the holes 9R, 9L. As shown in FIGS. 5 and 8, the differential case 2 has side gear passing holes 12R, 12L arranged symmetrically about the rotational axis O (see FIG. 1) and equiangularly from the pinion supporters 10, 11. The differential case 2, as shown in FIGS. 1 to 3, further comprises a flange 13 for a ring gear at the left side. The flange 13 is circular on the plane perpendicular to the rotational axis O. The holes 9R, 9L for the drive shafts, as shown in FIGS. 2 and 3, form penetrating holes whose inner diameters are substantially even. A pair of (right and left) drive shafts 29 is respectively inserted into the pair of the holes 9R, 9L (FIG. 11 shows one of them). A pair of spherical seats 9Ra, 9La for the thrust washers 6R, 6L is respectively formed at the peripheries of the holes 9R, 9L on the inner surface of the differential case 2.

Figure 9:
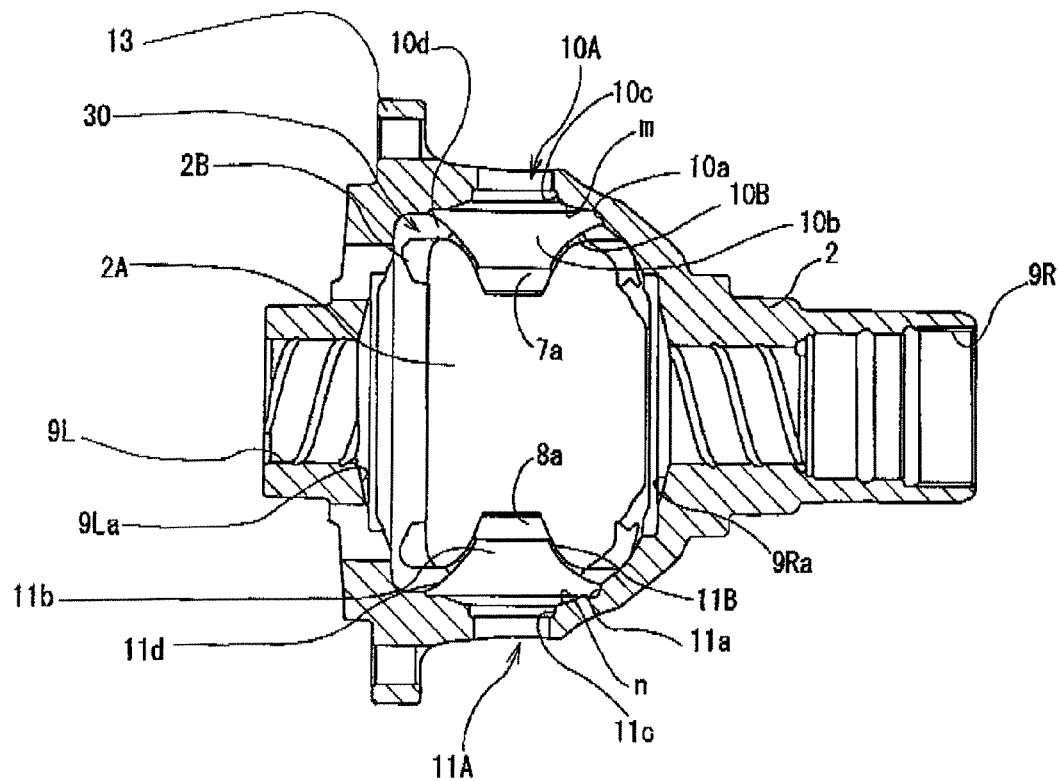
FIG. 9 is a section view of FIG. 7 parallel to the rotational axis of the differential case.

The pinion gear supporters 10, 11, as shown in FIGS. 5 and 8, are respectively made by the pinion gear back holes 10A, 11A and the extensions 10B, 11B. The pinion back holes 10A, 11A, as shown in FIG. 6(a), respectively form step-like holes to support the pinion gears 3, 4 and have notches 10d, 11d connecting with the reservoir 30. The pinion back holes 10A, 11A respectively have inner openings whose inner diameters are substantially the same to outer diameters of the pinion gears 3, 4. The inner surfaces of the pinion back holes 10A, 11A respectively form the pinion gear supporting surfaces 10a, 11a in order to support the first supported portions 3a, 4a of the pinion gears 3, 4. As shown in FIGS. 8 and 9, spherical pinion gear seats "m" and "n" are respectively formed with predetermined curvature at first step surfaces of the pinion gear back holes 10A, 11A so as to bear the pinion gears 3, 4 receiving the centrifugal force. Washer seats 10c, 11c are respectively formed at second step surfaces of the back holes 10A, 11A to receive washers 21, 22. The washers 21, 22, as shown in FIGS. 5 and 6, are respectively interposed between the back of the pinion gears 3, 4 and the washer seats 10c, 11c. The washers 21, 22 respectively close the pinion back holes 10A, 11A so as to block the lubricant oil receiving the centrifugal force by the rotation of the differential case 2. Thus the lubricant oil is prevented from flowing out from the differential case 2 through the back holes 10A, 11A. As shown in FIGS. 5 and 8, the extensions 10B, 11B are equiangularly aligned and extend inwardly (toward the rotational axis O of the differential case 2) at the peripheries of the pinion gear back holes 10A, 11A, respectively. The extensions 10B, 11B have the pinion gear supporting surfaces 10b, 11b that connect with the pinion gear supporting surfaces 10a, 11a and support a part of the first supported portions 3a, 4a and the second supported portions 3b, 4b (a part of engaging portion with the side gears).

The side gear passing holes 12R, 12L, as shown in FIGS. 3 to 5, have openings with non-circular plain-like. The openings of the holes 12R, 12L have enough size to insert the pinion gears 3, 4 and the side gears 5R, 5L into the differential case 2.

Figure 10A:
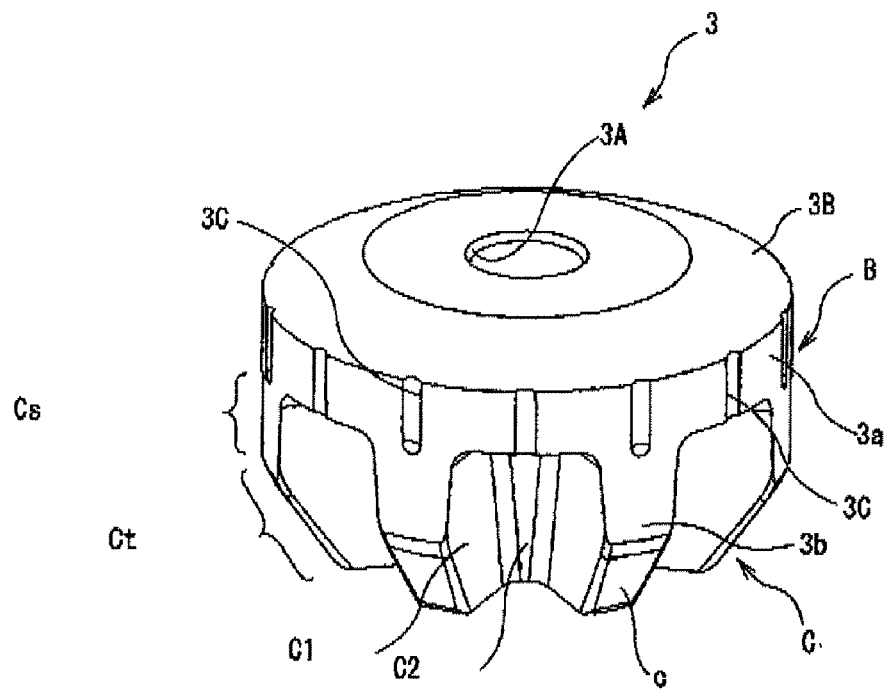
FIGS. 10(a) and 10(b) are a perspective view of a pinion gear.
Figure 10B:
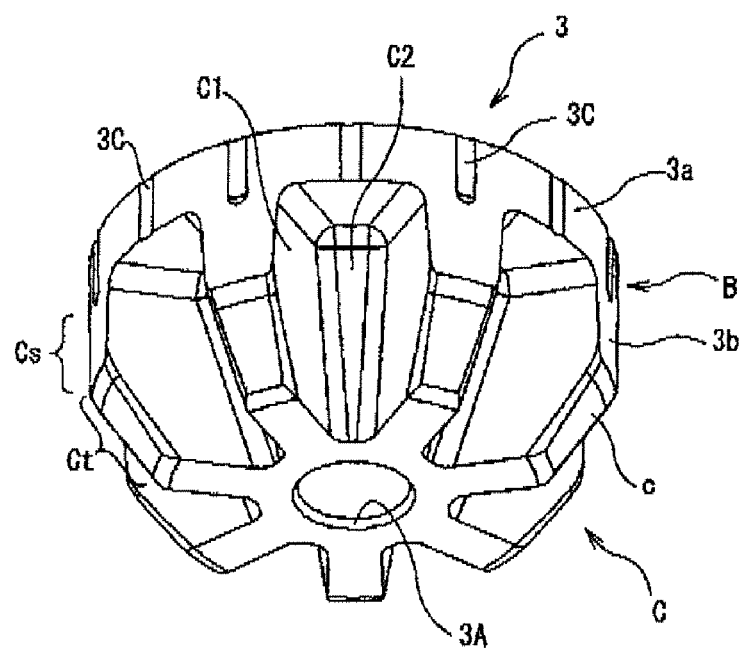

Because the pinion gears 3, 4 are substantially the same, the pinion gear 3 will be described. The pinion gear 3, as shown in FIGS. 10(a) and 10(b), is substantially cylindrical and so-called shaftless type gear that comprises the base end B and the gear portion C. The base end B has a circumferential surface with a predetermined outer diameter. The gear portion C has teeth C1 and grooves C2 arranged alternately. As shown in FIG. 5, the pinion gear 3 is rotatably supported by the pinion gear supporter 10a of the pinion back hole 10A and the pinion gear supporter 10b of the extension 10B.

The base end B of the pinion gear 3 has the first supported portion 3a and plural lubricant grooves 3C. The first supported portion 3a works as a sliding surface on the pinion gear supporter 10a of the pinion back hole 10A. The lubricant grooves 3C work as openings to the sliding surface of the first supported portion 3a in order to introduce the lubricant oil there. The lubricant grooves 3C of the pinion gear 3 are arranged equiangularly. When the pinion gear 3 revolves (the differential case 2 rotates), the lubricant grooves 3C hold the lubricant oil and introduce it to the clearance between the first supported portion 3a and the pinion gear supporters 10a, 10b. Therefore enough lubricant oil is supplied to the first supported portion 3a of the pinion gear 3 as the sliding surface so that the first supported portion 3a is hardly seized. In addition, because the lubricant grooves 3C are longitudinally made along the rotational axis of the pinion gear 3 and open to at least one of the sides of the pinion gear seat "m" and the rotational axis O of the differential case 2, the lubricant oil flows to the back of the pinion gear 3 by the centrifugal force when the pinion gear 3 revolves.

The pinion gear 3, as shown in FIGS. 10(a) and 10(b), further comprises penetrating bore 3A along its axis. Thus heat treatment performs not only outside but also inside of the pinion gear 3 so that the pinion gear 3 is strengthened mechanically. The penetrating bore 3A works as a centering bore when forming the gear, a rod insert bore when storing the gear in a storage and a lubricant oil supply bore when using the differential gear.

The base end B of the pinion gear 3 exists at the opposite side engaging with the side gears 5R, 5L, and is made except where the gear portion C is made. The first supported portion 3a is made at the circumferential surface of the base end B, being supported by the pinion gear supporter 10a of the back hole 10A and the pinion gear supporter 10b of the extension 10B. A spherical sliding portion 3B, as shown in FIGS. 10(a) and 10(b), is made at the back face of the pinion gear 3 so as to slide on the pinion gear seat "m" of the pinion gear back hole 10A. The gear portion C, as shown in 10(a) and 10(b), has straight portions Cs and taper portions Ct. The straight portions Cs include the second supported portion 3b of the pinion gear 3 at the circumferential surface. The taper portions Ct connect with the straight portions Cs. The gear portion C engages with the side gears 5R, 5L at closer side of the rotational axis of the differential case 2. Tops "c" of teeth C1 of the gear portion C have circumferential surfaces with predetermined outer diameter, and have cone-like circumferential surfaces whose outer diameter is reducing toward the tip of the gear.

The side gears 5R, 5L, as shown in FIG. 2, are substantially circular gears that have boss portions 5Ra, 5La and gear portions 5Rb, 5Lb, respectively. In detail, the side gears 5Ra, 5La are bevel gears which have larger outer diameters than the pinion gears 3, 4 do and one conical angle of the top teeth. The side gears 5R, 5L are rotatably supported in the differential case 2 and engage with the pinion gears 3, 4. The number of teeth of the side gears 5R, 5L is 2.1 times or more than the one of the pinion gears 3, 4, for example, the number of teeth of the side gears 5R, 5L is fifteen and of the pinion gears 3, 4 is seven. The surfaces of the side gears 5R, 5L form spherical sliding portions 5Rc, 5Lc which adjust to the seats 9Ra, 9La via the thrust washers 6R, 6L, respectively. The side gears 5R, 5L, as shown in FIG. 11, respectively have bores 9R, 9L which are spline-connected with the drive shafts 29. There are some spaces G equiangularly made by missing teeth at the spline-connections 5Ra, 5La between the side gears 5R, 5L and the drive shafts 29, the spaces G work as paths 28 to supply the lubricant oil.

Figure 12:
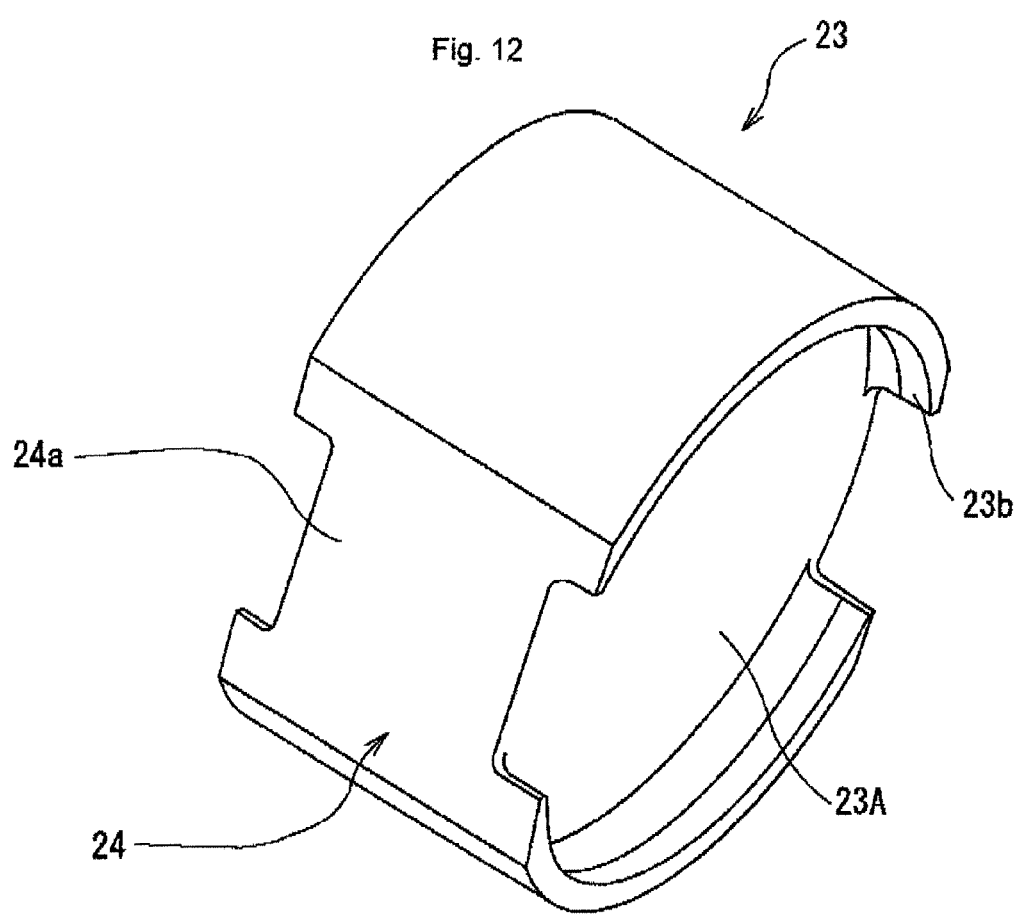
FIG. 12 is a perspective view of a spacer of the first embodiment.

FIGS. 2 and 3 show an axle spacer 23 interposed between the side gears 5R, 5L. The axle spacer 23, as shown in FIGS. 3 and 12, is substantially cylindrical and has a pair of (right and left) concavities 23a, 23b to fit the tip of the drive shafts 29 into. The axle spacer 23 is arranged around the rotational axis O of the differential case 2 so as to perform smooth and reliable spline-connections between the drive shafts 29 and the side gears 5R, 5L. Bearing surfaces 23A, 23B are formed on the bottoms of the concavities 23a, 23b so as to support the tips of the drive shafts 29. The axle spacer 23 has missing parts 24, 25 which are planes 24a, 25a parallel to the hypothetical plane passing through its axis. The missing parts 24, 25, as shown in FIG. 3, are equiangularly arranged on the circumferential surface of the axle spacer 23. Therefore, during the differential case 2 rotates, the missing parts 24, 25 stir the lubricant oil which is well introduced to the first supported portions 3a, 4a of the pinion gears 3, 4. Further lubricant oil is supplied to the first supported portions 3a, 4a of the pinion gears 3, 4, because the missing parts 24, 25 fluidly connect with the outside of the differential case 2 through the paths 28 (see FIG. 11).

The thrust washers 6R, 6L, as shown in FIGS. 1 to 3, are circular washers that have ring portions 6Ra, 6La receiving thrust forces of the side gears 5R, 5L, respectively. The thrust washers 6R, 6L are interposed between the backs of the side gears 5R, 5L and the seats 9Ra, 9La for the thrust washers, and adjust the engagement between side gears 5R, 5L and the pinion gears 3, 4. Each thrust washer 6R, 6L has lock tongues 26, 27 at its periphery equiangularly and outwardly. The lock tongues 26, 27 are locked the outer surfaces of the side gears 5R, 5L with plastic deformation. The lock tongues 26, 27 allow the side gears 5R, 5L to rotate and prevent the thrust washers 6R, 6L from moving radially about the side gears 5R, 5L. Deformed to the side gears 5R, 5L plastically, the thrust washers 6R, 6L are integrated with the side gears 5R, 5L. Thus when the drive shafts 29 are inserted into the side gears 5R, 5L, the thrust washers 6R, 6L are not displaced from the side gears 5R, 5L radially so that the number of the processes to insert the drive shafts 29 is reduced. Therefore the process to insert the drive shafts are simplified so as reduce the cost. The thickness of each lock tongue 26, 27 is thinner than the thickness of each ring portion 6Ra, 6La. Such dimension lets the lock tongues 26, 27 be well-deformed so as to simplify combining the thrust washers 6R, 6L with the side gears 5R, 5L. The lock tongues 26, 27 may be removed after the drive shafts 29 inserted, because the lock tongues 26, 27 have no more function.

Next, the operation of the differential gear 1 will be described. The engine torque is input to the differential case 2 through a drive pinion and a ring gear, so as to rotate the differential case 2 about the rotational axis O. The rotational force of the differential case 2 is transmitted to the pinion gears 3, 4 and then transmitted to the side gears 5R, 5L via the pinion gears 3, 4. The drive shafts 29 are respectively spline-engaged with the side gears 5R, 5L, and therefore the engine torque is transmitted to the right and left drive shafts 29 via the drive pinion, ring gear, differential case 2, pinion gears 3, 4 and side gears 5R, 5L.

The rotation of the differential case 2 causes lubrication of the pinion gears 3, 4 and the pinion gear supporters 10, 11 as explained in (1) to (4) below.

(1) During the rotation of the differential case 2, the lubricant oil is pressed onto the inner cylindrical surface of the differential case 2 by the centrifugal force. As shown in FIG.

Figure 13:
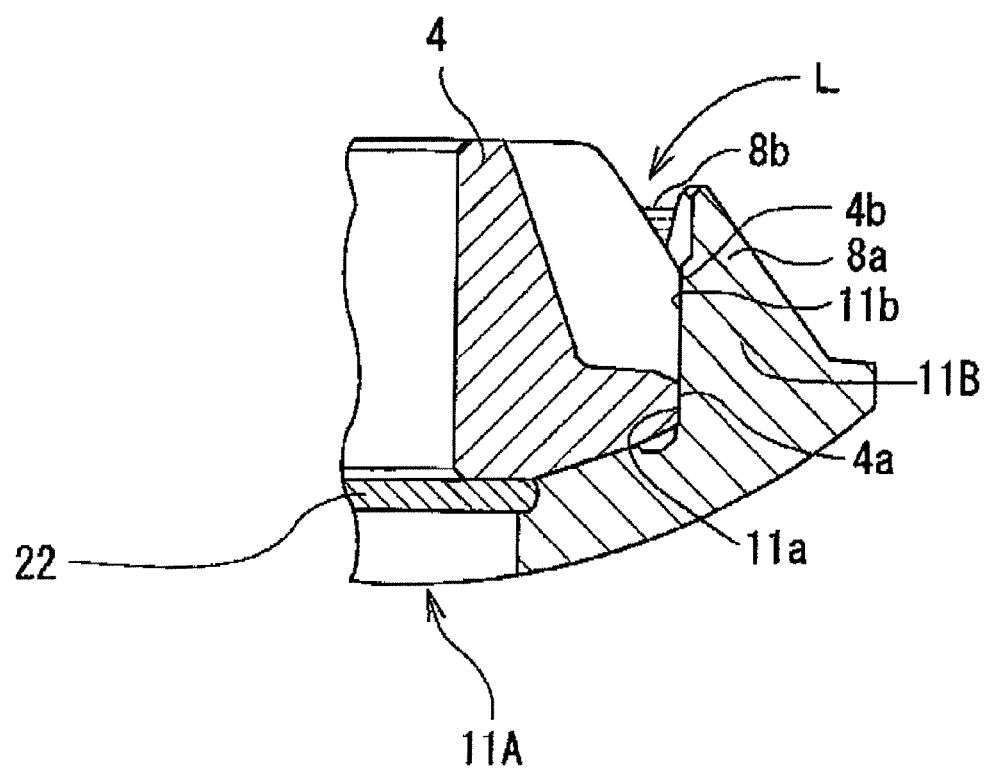
FIG. 13 is a partial section view of the first embodiment to describe how to supply lubricant oil.

13, because the differential case 2 inwardly has the lubrication inlets 7, 8 (FIG. 13 shows one of them) with the projections 7a, 8a, the lubricant oil L is scooped up by the projections 7a, 8a and is served in the spaces 7b, 8b. The lubricant oil L is then introduced between the sliding surfaces of the pinion gears 3, 4 (the first supported portions 3a, 4a of the base ends and the second supported portions 3b, 4b of the gear portions C, see FIG. 10) and the pinion gear supporting surfaces of the pinion gear supporters 10, 11 (the pinion gear supporting surfaces 10a, 11a of the pinion gear back holes 10A, 11A and the pinion gear supporting surfaces 10b, 11b of the extensions 10B, 11B), so as to lubricate the surfaces 3a, 4a, 10a, 11a, 10b, 11b.

(2) As shown in FIGS. 6(a) and 6(b), the differential case 2 inwardly has the lubricant oil reservoir 30 of the concavity surrounding the rotational axis O, the centrifugal force lets the lubricant oil L be served in the reservoir 30. Thus the lubricant oil L is introduced to and lubricates the first supported portions 3a, 4a of the pinion gears 3, 4 through the notches 10d, 11d from the reservoir 30.

(3) As shown in FIGS. 10(a) and 10(b), the pinion gears 3, 4 have the first supported portions 3a, 4a which work as the sliding surfaces against the pinion gear supporting surfaces 10b, 11b of the extensions 10B, 11B and the pinion gear supporting surfaces 10a, 11a of the pinion gear back holes 10A, 11A. The lubricant grooves 3C are formed on the first supported portions 3a, 4a in a longitudinal direction of the pinion gears 3, 4 and are opened to at least one of the sides. Thus, during the rotation of the differential case 2, the lubricant oil is introduced into the lubricant grooves 3C so as to be supplied and lubricate between the first supported portions 3a, 4a and the pinion gear supporting surfaces 10a, 11a, 10b, 11b.

(4) The axle spacer 23 interposed between the side gears 5R, 5L has the missing parts 24, 25 with the planes 24a, 25a parallel to the hypothetical plane passing through its axis, as shown in FIG. 12. Thus the lubricant oil in the side gears 5R, 5L is able to be supplied between the first supported portions 3a, 4a and the pinion gear supporting surfaces 10a, 11a, 10b, 11b. And the lubricant oil is able to be introduced to the missing parts 24, 25 through the clearance between the holes 9R, 9L from the outside of the differential case 2 and the drive shafts 29, so as to be further supplied therebetween.

Next, the operation of the differential gear 1 will be described. The engine torque is transmitted to the differential case 2. Where the same loads are given to respective wheels connected with the right and left drive shafts 29, the pinion gears 3, 4 revolve about the rotational axis O of the differential case 2 and then the side gears 5R, 5L rotate with the differential case 2 unitedly. Therefore the engine torque is equally divided to the right and left drive shafts 29 and the right and left wheels are rotated at the same speed.

In the meanwhile, where the vehicle turns to the right/left or one of the wheels slips, the pinion gears 3, 4 rotate and revolve. Thus the engine torque is unequally divided to the right and left drive shafts 29 and the right and left wheels are rotated at different speed. In the event of the rotation of the pinion gears 3, 4 during the torque loads to the differential case 2, the first and second supported portions 3a, 4a, 3b, 4b of the pinion gears 3, 4 slide on the pinion gear supporting surfaces 10a, 11a, 10b, 11b so that frictional resistance occurs therebetween. The frictional resistance limits the differential rotation between the right and left side gears 5R, 5L. The rotations of the pinion gears 3, 4 also cause thrust forces of respective pinion and side gears 3, 4, 5R, 5L at the engagement portions. The side gears 5R, 5L are moved away each other by the thrust forces and press the thrust washers 6R, 6L to the seats 9Ra, 9La so that another frictional resistance occurs therebetween. The frictional resistance also limits the differential rotation between the right and left side gears 5R, 5L. Further the thrust forces for the pinion gears 3, 4 let the pinion gears 3, 4 be pressed to the seats "m", "n". There occurs the frictional resistance against the rotations of the pinion gears 3, 4. The frictional resistance also limits the differential rotation between the right and left side gears 5R, 5L.

Figure 14:
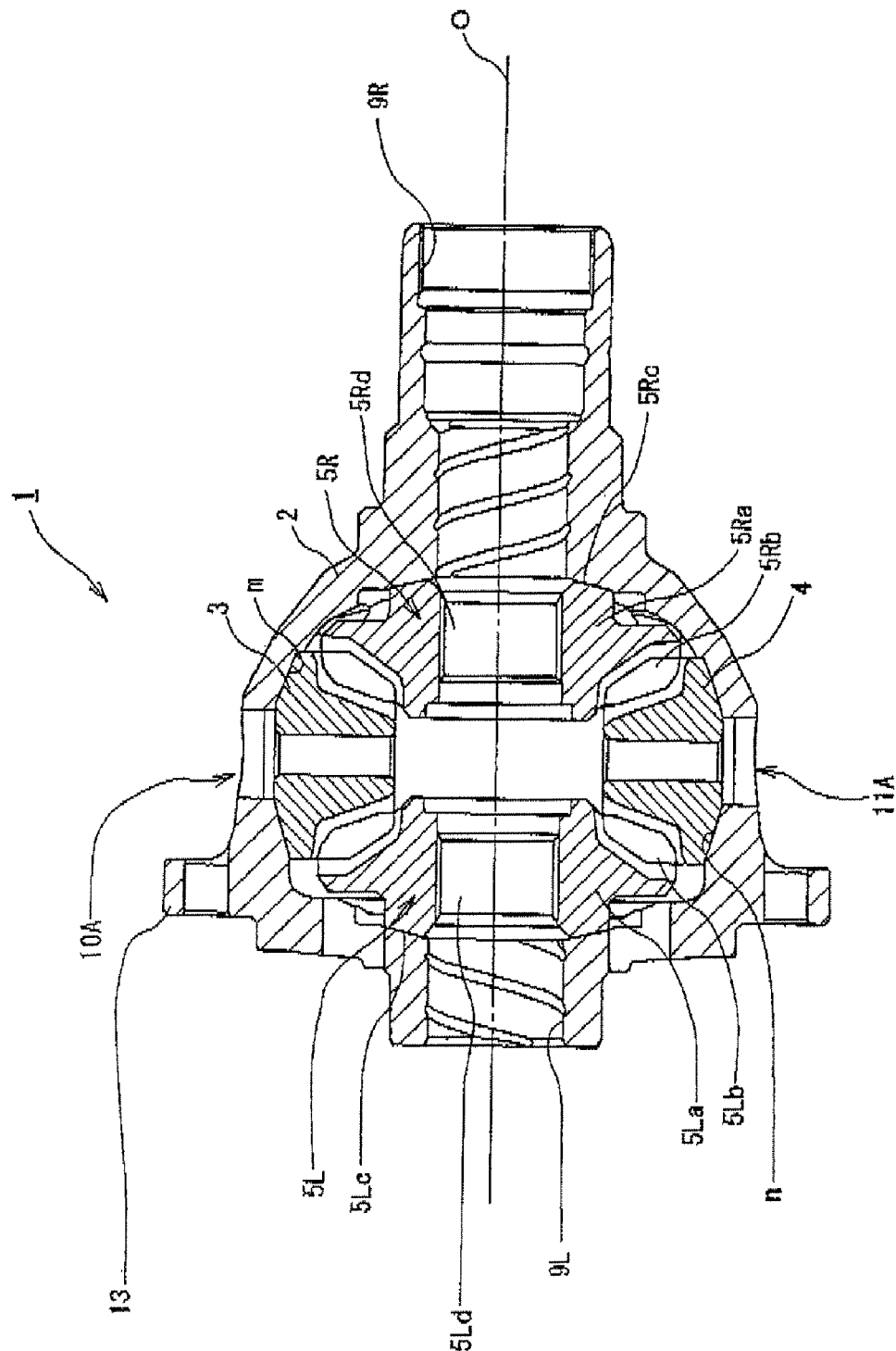
FIG. 14 is an explanatory section view of the side gear assembling process in an assembling method of the differential gear of the first embodiment.
Figure 15:
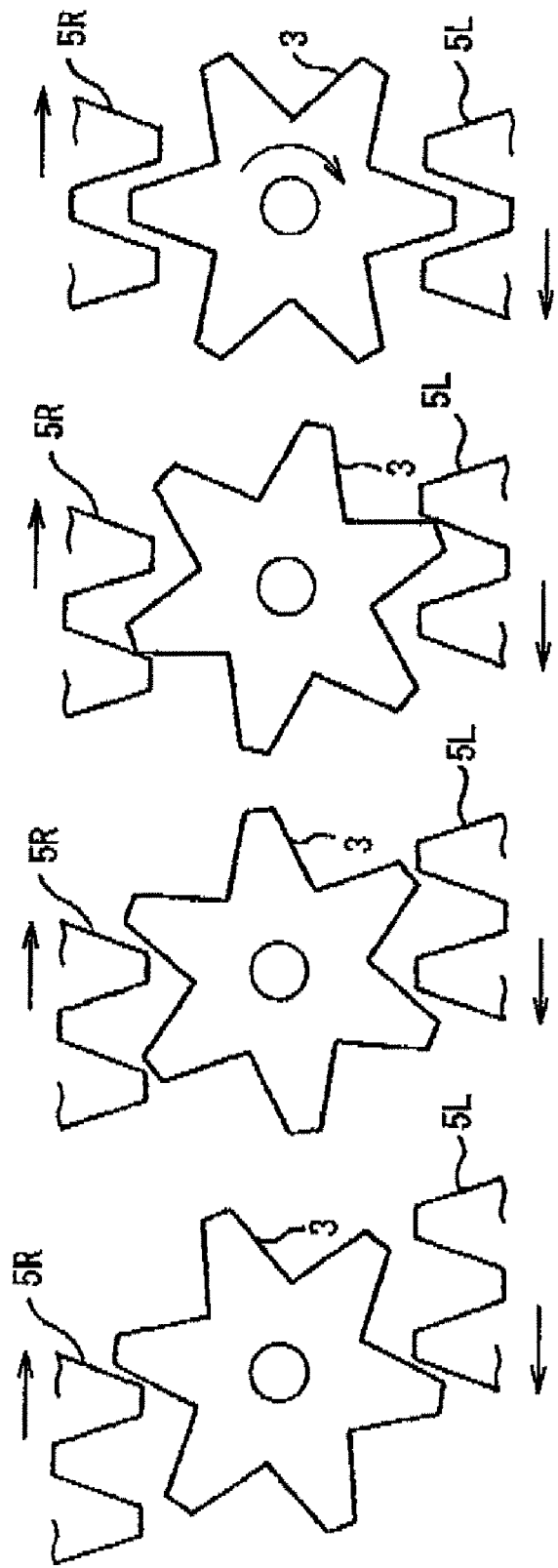
FIGS. 15(a) to 15(d) are step-by-step explanatory schematic plan views of FIG. 14.

Next, there will be described an example of an assembling method of the differential gear 1 according to the first embodiment with reference to FIGS. 2, 3, 5, 14 and 15. FIG. 14 is an explanatory section view of the side gear assembling process in the assembling method of the differential gear 1 of the first embodiment. FIGS. 15(a) to 15(d) are step-by-step explanatory schematic plan views of the assembling method. The assembling method of the differential gear 1 comprises inserting the pinion gears 3, 4 (first step), inserting the side gears 5R, 5L (second step), engaging the pinion gears 3, 4 with the side gears 5R, 5L (third step) and positioning the thrust washers 6R, 6L (forth step) sequentially. These four steps will be explained below.

[Inserting the Pinion Gears 3, 4]

The pinion gears 3, 4 are inserted into the differential case 2 through the side gear passing holes 12R, 12L. Then the pinion gears 3, 4 are moved where the slide portions 3B, 4B are touched onto the pinion gear seats "m", "n" so as to be supported by the pinion gear supporters 10, 11 at the predetermined positions, as shown in FIG. 5.

[Inserting the Side Gears 5R, 5L]

The side gears 5R, 5L are inserted into the differential case 2 though the side gear passing holes 12R, 12L and moved toward the thrust washer seats 9Ra, 9La. Then the axes of the side gears 5R, 5L are aligned on the rotational axis O of the differential case 2, as shown in FIG. 14. At the time, the teeth of the side gears 5R, 5L may hit the teeth of the pinion gears 3, 4. However, as shown in FIGS. 15(a) to 15(d), the side gears 5R, 5L are rotated each other in opposite direction to rotate the pinion gears 3, 4 during the insertion, so that the side gears 5R, 5L are smoothly inserted into the differential case 2. Then the side gears 5R, 5L are aligned on the rotational axis O so as to be set in the differential case 2.

[Engaging the Pinion Gears 3, 4 with the Side Gears 5R, 5L]

With adjusting the clearance between the thrust washer seats 9Ra, 9La and the side gears 5R, 5L, as shown in FIG. 3, the thrust washers 6R, 6L are interposed between the sliding portions 5Ra, 5La of the side gears 5R, 5L and the thrust washer seats 9Ra, 9La around the holes 9R, 9L for the drive shafts 29. When the interposition of the thrust washers 6R, 6L is completed, the side gears 5R, 5L are engaged with the pinion gears 3, 4. For smooth and reliable connection of the drive shafts 29 with the side gears 5R, 5L (the spline connection), the axle spacer 23 is interposed between the pair of the side gears 5R, 5L during the engagement.

[Positioning the Thrust Washers 6R, 6L]

The lock tongues 26, 27 of the thrust washers 6R, 6L are deformed in order to lock the thrust washers 6R, 6L on the circumstance of the side gears 5R, 5L. Thus the thrust washers 6R, 6L are fixed on the backs of the side gears 5R, 5L.

The above described first embodiment gains following advantages.

(1) The lubricant oil is well supplied to the base end of the pinion gears 3, 4 (between the first supported portions 3a, 4a and the pinion gear supporters 10a, 11a, 10b, 11b). Therefore the outer surfaces of the pinion gears 3, 4 are hardly burned out.

(2) The projections 7a, 8a of the lubricant oil inlet 7, 8 work as radiation fins so as to radiate the frictional heat between the first supported portions 3a, 4a and the pinion gear supporters 10a, 11a, 10b, 11b to the lubricant oil.

(3) The lubricant oil reservoir 30 is the concavity surrounding the rotational axis O of the differential case 2 beside the pinion gear supporters 10, 11. Therefore the reservoir 30 disperses stresses at the feet of the pinion gear supporters 10, 11 so as to strengthen the differential case 2.

(4) Because the thrust washers 6R, 6L have the deformable lock tongues 26, 27, the thrust washers 6R, 6L are integrated with the side gears 5R, 5L by deforming the lock tongues 26, 27. When the drive shafts 29 are inserted into the side gears 5R, 5L, the thrust washers 6R, 6L are not displaced from the side gears 5R, 5L radially. Therefore the number of the processes to insert the drive shafts 29 is reduced so as to simplify the connecting processes of the drive shafts and reduce the cost.

(5) There are the spaces G by the missing teeth at the spline-connections 5Rc, 5Lc between the inner surfaces of the side gears 5R, 5L and the outer surfaces of the drive shafts 29. The lubricant oil is introduced into the differential case 2 from the outside through the holes 9R, 9L and the paths in the spaces Q whereby there is increased the amount of supplying the lubricant oil between the first supported portions 3a, 4a and the pinion gear supporters 10a, 11a, 10b, 11b.

Figure 16:
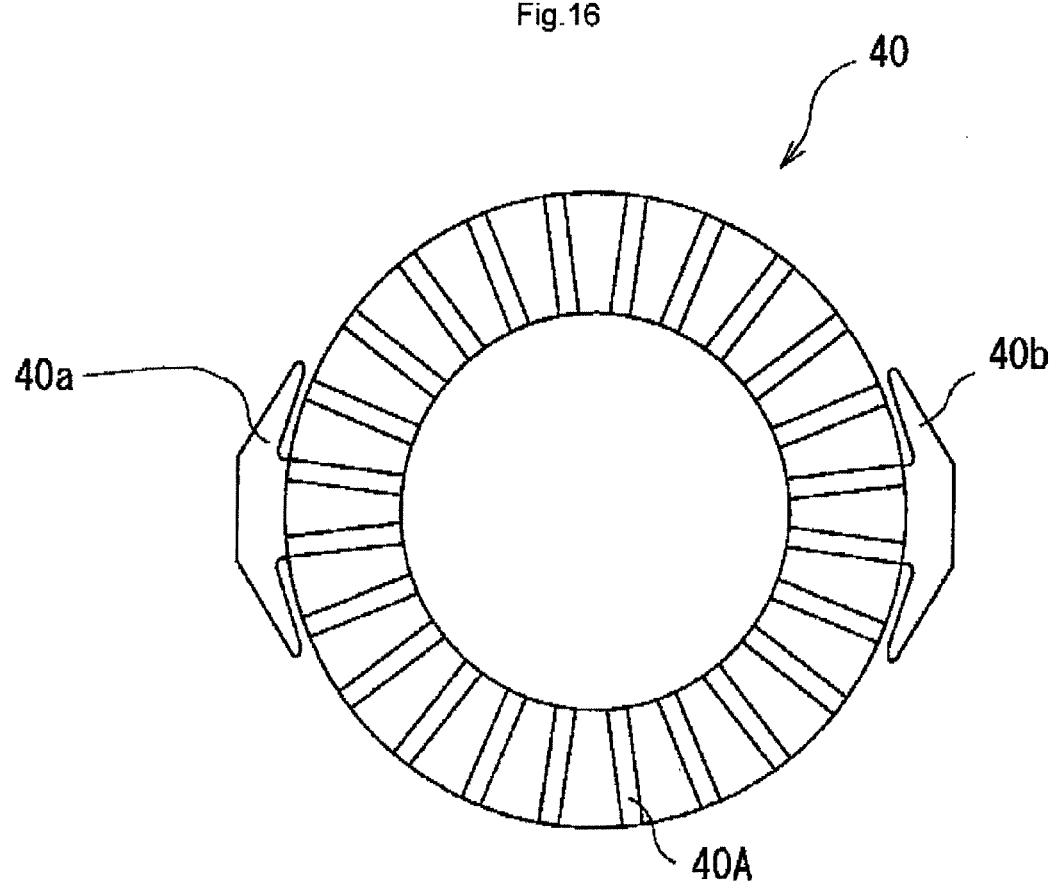
FIG. 16 is a modification of a thrust washer of the first embodiment.
Figure 17:
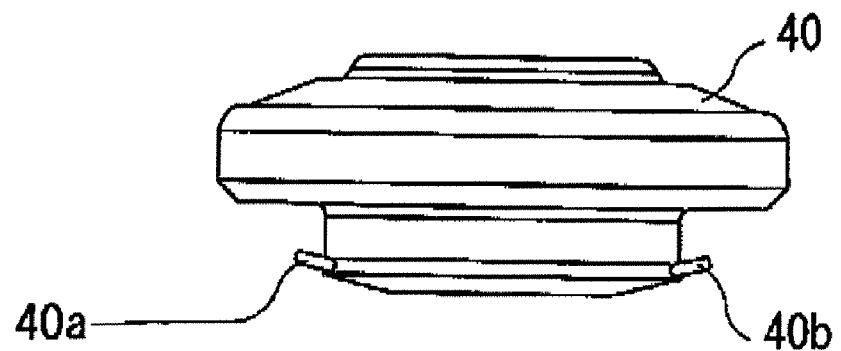
FIGS. 17(a) and 17(b) are explanatory drawings of the first embodiment to describe the thrust washer before hooking.
Figure 17:
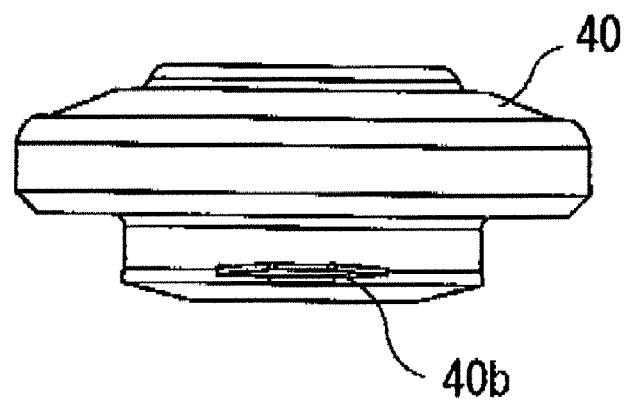
Figure 18:
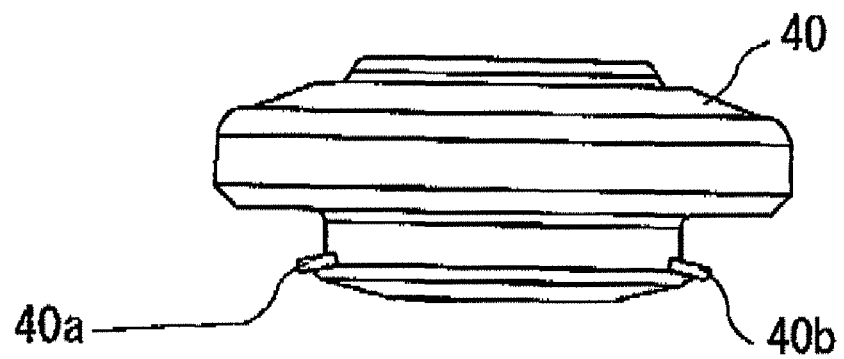
FIGS. 18(a) and 18(b) are explanatory drawings of the first embodiment to describe the thrust washer after hooking.
Figure 18:
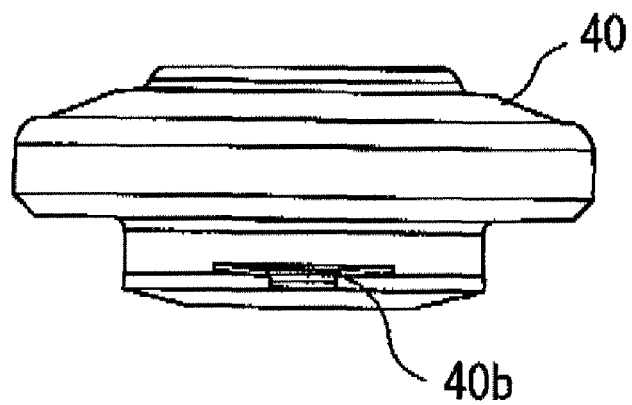

Incidentally, the shape of the lock tongues is not limited as shown in FIG. 1. For example, the thrust washers 40 may have T-shaped lock tongues 40a, 40b as shown in FIG. 16. In this case, the thrust washers 40 shown in FIGS. 17(a) and 17(b) are touched on the backs of the side gears 5R, 5L, then the lock tongues 40a, 40b are deformed so as to be locked to the side gears 5R, 5L. The thrust washers 40 shown in FIG. 16 have paths 40A in order to introduce the lubricant oil from inward to outward. Thus the lubricant oil is well supplied to the pinion gears 3, 4.

Although the lock tongues 26, 27, 40a, 40b of the thrust washers 6R, 6L, 40 are locked to the side gears 5R, 5L explained above, the lock tongues may be locked to the differential case. Or, the differential case may have the lock tongues to be locked to the thrust washers. Moreover, the side gears may have the lock tongues to be locked to the thrust washers. The thing is, the thrust washers are interposed between the side gears and the differential case and are kept locking to the side gears or the differential case.

Figure 19:
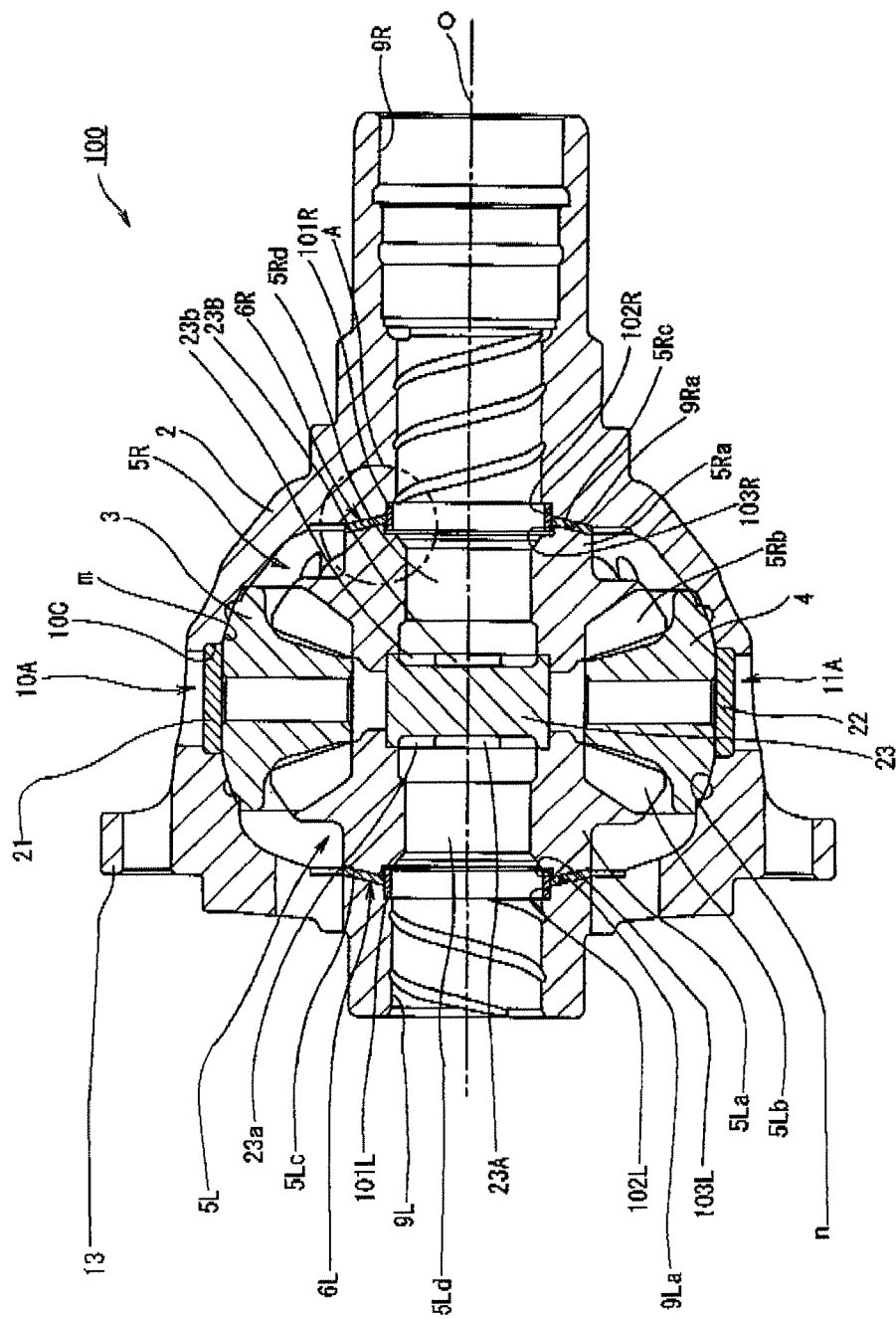
FIG. 19 is a longitudinal section view of a second embodiment related to the invention.
Figure 20:
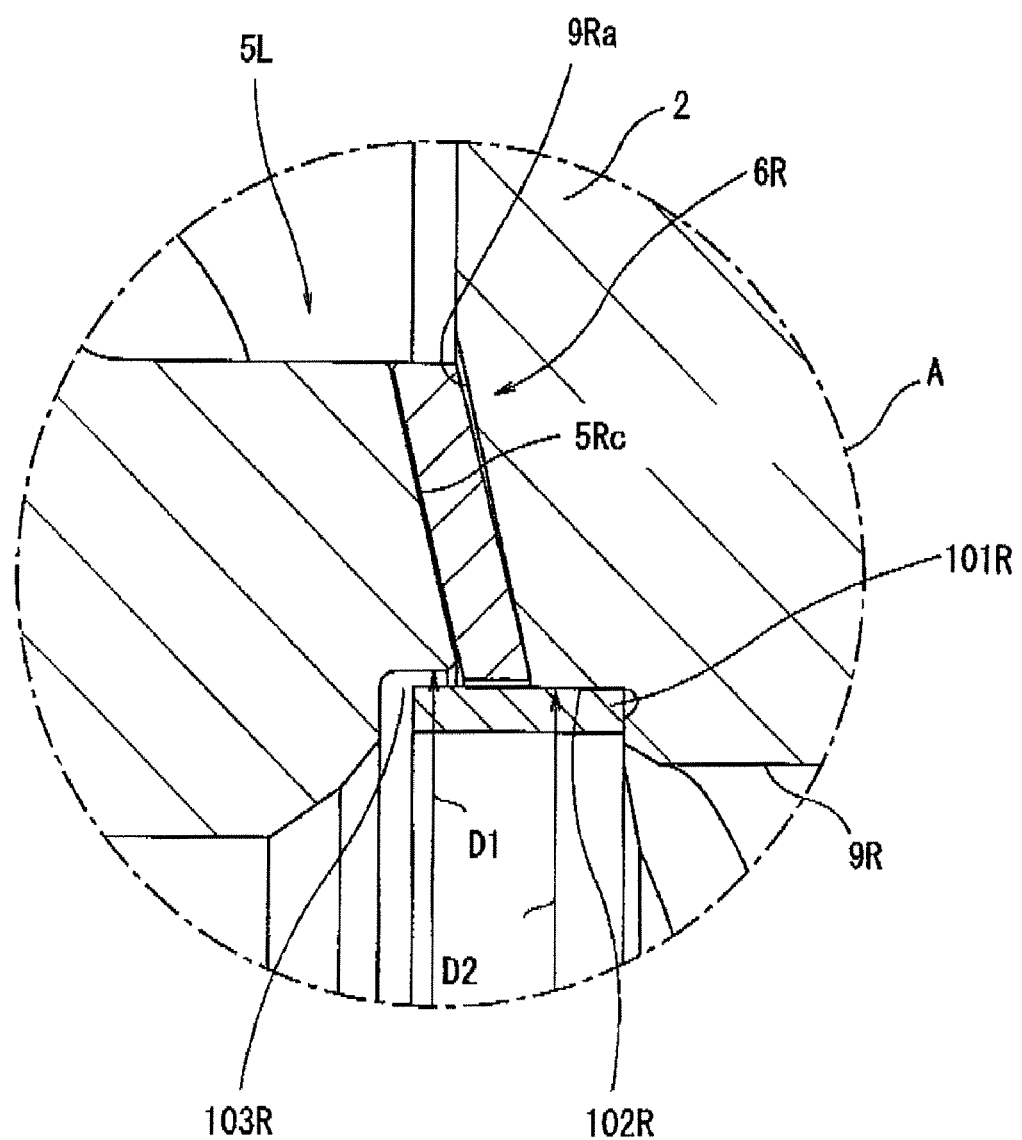
FIG. 20 is a partial enlarged view of FIG. 19.

A second embodiment of the differential gear for the vehicle related to the present invention will be described with reference to FIGS. 19 and 20. In FIGS. 19 and 20, the same/equivalent parts will be indicated by the same reference numbers/symbols to FIGS. 1 to 15 and the explanation of those parts will be omitted.

As shown in FIG. 19, the differential gear 100 comprises a pair of restriction rings 101R, 101L which restrict respective radial movement of the thrust washers 6R, 6L. The restriction rings 101R, 101L are interposed between the backs of the side gears 5R, 5L and the peripheries of the inner openings of the holes 9R, 9L for the drive shafts 29, and are inserted into the thrust washers 6R, 6L. The restriction rings 101R, 101L are snap rings (elastic rings). The inner openings of the holes 9R, 9L have first rooms 102 R, 102L to hold one ends of the restriction rings 101R, 101L. The outer surfaces of the restriction rings 101R, 101L press to the inner surfaces of the first rooms 102R, 102L. The inner openings on the backs of the side gears 5R, 5L have second rooms 103R, 103L to hold the other ends of the restriction rings 101R, 101L. As shown in FIG. 20, the inner diameters D1 of the second rooms 103R, 103L are larger than the inner diameters D2 of the first rooms 102R, 102L (D1>D2). Thus the restriction rings 101R, 101L does not press to the inner surfaces of the second rooms 103R, 103L.

Next, the assembling method of the second embodiment will be described with reference to FIG. 19. The assembling method of the differential gear 100 comprises inserting the pinion gears 3, 4 (first step), inserting the side gears 5R, 5L (second step), engaging the pinion gears 3, 4 with the side gears 5R, 5L (third step) and positioning the thrust washers 6R, 6L (forth step) sequentially. The pinion gears 3, 4, inserting the side gears 5R, 5L and engaging the pinion gears 3, 4 with the side gears 5R, 5L are substantially the same to the first embodiment. Thus the explanation of these three steps will be omitted and positioning the thrust washers 6R, 6L will be explained below.

[Positioning the Thrust Washers 6R, 6L]

As shown in FIG. 19, the restriction rings 101R, 101L are reduced about the diameters and are inserted into the holes 9R, 9L for the drive shafts 29 from the outer openings. The restriction rings 101R, 101L are further inserted into the thrust washers 6R, 6L and the side gears 5R, 5L. The restriction rings 101R, 101L are disposed with pressing the first rooms 102R, 102L of the holes 9R, 9L at one ends but without pressing the second rooms 103R, 103L at the other ends. Thus the restriction rings 101R, 101L are attached to the first rooms 102R, 102L by insertion so as to position the thrust washers 6R, 6L between the backs of the side gears 5R, 5L and thrust washer seats 9Rc, 9Lc without radial movement.

The second embodiment gains the following advantage in addition to the advantages (1) to (5) of the first embodiment.

The restriction rings 101R, 101L are attached to the first rooms 102R, 102L by insertion so as to position the thrust washers 6R, 6L without radial movement. Therefore no deformation is needed so that the positioning the thrust washer process is simplified.

Obviously, numerous modifications and variations of the present invention are possible in light of the above teachings. It is thereby to be understood that within the scope of the appended claims, the present invention may be practiced otherwise than as specifically described herein.

(1) For example, although the described differential case 2 is one piece, the differential case may have plural case elements.

(2) For example, although the described differential gear has a pair of the pinion gears 3, 4 in the differential case 2, three pinion gears may be disposed in the differential case 2. In this case, preferable is smaller dimension of the pinion gears.

What is claimed is:

1. A differential gear for a vehicle comprising:
    a differential case having plural pinion gear supporters inwardly and a pair of holes for drive shafts;
    plural pinion gears slidably supported by the pinion gear supporters respectively;
    a pair of side gears engaging with the pinion gears and connected with the respective drive shafts; and
    a pair of annular thrust washers respectively interposed between backs of the side gears and peripheries of the holes for the drive shafts,
    wherein the thrust washers are provided with plastically deformable lock portions at a radially outer side of the annular thrust washers engageable with the side gears to prevent radial movement of the thrust washers relative to the side gears.

2. The differential gear according to claim 1,
    wherein the thrust washers have paths to introduce lubricant oil from inward to outward.

3. The differential gear according to claim 1,
wherein the lock portions are deformable lock tongues.

4. The differential gear according to claim 3,
wherein each thrust washers equiangularly have plurality of the lock tongues.

5. The grinding method according to claim 1,
wherein the lock portions are disposed allowing rotation of the side gears.

6. The differential gear according to claim 1,
wherein the pinion gears are shaftless type gears.

7. The differential gear according to claim 1,
wherein the pinion gear supporters are extended from inner surface of the differential case.

8. The differential gear according to claim 1, wherein a thickness of the lock portions is less than that of the thrust washers to provide the plastic deformability.

9. An assembling method of a differential gear for a vehicle comprising:
   a first step to insert plural pinion gears into a differential case having a pair of holes for drive shafts;
   a second step to insert a pair of side gears into the differential case with alignment of axes of the drive shafts and the side gears;
   a third step to engage the side gears with the pinion gears and to interpose a pair of thrust washers having lock tongues between backs of the side gears and peripheries of the holes; and
   a fourth step to plastically bend the lock tongues to lock the lock tongues to the side gears.

10. The assembling method according to claim 9,
wherein, in the second step, the side gears are moved to rotate the pinion gears during inserting into the differential case.

11. The assembling method according to claim 9, comprising the further steps of inserting the drive shafts into the side gears and subsequently removing the lock tongues from the thrust washers.

* * * * *